United States Patent
Bradley

(10) Patent No.: US 9,457,919 B2
(45) Date of Patent: Oct. 4, 2016

(54) CLIMATE-REGULATING-SYSTEM

(71) Applicant: Curtis Bradley, Scottsdale, AZ (US)

(72) Inventor: Curtis Bradley, Scottsdale, AZ (US)

(*) Notice: Subject to any disclaimer, the term of this patent is extended or adjusted under 35 U.S.C. 154(b) by 0 days.

(21) Appl. No.: 14/589,733

(22) Filed: Jan. 5, 2015

(65) Prior Publication Data

US 2016/0194096 A1    Jul. 7, 2016

(51) Int. Cl.
| | | |
|---|---|---|
| *B64G 1/10* | (2006.01) | |
| *B64G 1/58* | (2006.01) | |
| *G09F 15/00* | (2006.01) | |
| *B64G 1/56* | (2006.01) | |
| *G06Q 10/10* | (2012.01) | |
| *B64G 1/22* | (2006.01) | |
| *B64G 1/52* | (2006.01) | |
| *H01Q 1/28* | (2006.01) | |

(52) U.S. Cl.
CPC ............. *B64G 1/58* (2013.01); *B64G 1/222* (2013.01); *B64G 1/56* (2013.01); *G06Q 10/103* (2013.01); *G09F 15/00* (2013.01); *B64G 2001/525* (2013.01); *H01Q 1/288* (2013.01)

(58) Field of Classification Search
CPC .... B64G 1/58; B64G 1/56; B64G 2001/525; B64G 1/54; B64G 1/222; B64G 1/50; B64G 1/503; B64G 1/44; G06Q 10/103; G09F 15/00; H01Q 1/288
See application file for complete search history.

(56) References Cited

U.S. PATENT DOCUMENTS

| | | | | |
|---|---|---|---|---|
| 5,762,298 A | * | 6/1998 | Chen | A01G 15/00 244/172.7 |
| 5,996,943 A | * | 12/1999 | Gode | A01G 15/00 126/618 |
| 8,143,607 B2 | * | 3/2012 | Teodorescu | G21F 3/00 250/505.1 |
| 2015/0230414 A1 | * | 8/2015 | Stelmack | A01G 15/00 239/2.1 |

FOREIGN PATENT DOCUMENTS

| | | | | |
|---|---|---|---|---|
| GB | 2446250 A | * | 8/2008 | ............ A01G 15/00 |
| WO | WO 9010378 A1 | * | 9/1990 | ............... B64G 1/10 |

OTHER PUBLICATIONS

Michael N. Mautner, A Spaced-Based Solar Screen Against Climatic Warming, 1991, Journal of the British Interplanetary Society, vol. 44, pp. 135-138.*
Teller, Wood & Hyde; Global Warming and Ice Ages; Aug. 1997; 22nd International Seminar on Planetary Emergencies.*
Corner & Pidgeon; Geoengineering the Climate: The Social and Ethical Implications; Jan./Feb. 2010; www.enviromentmagazine.org; vol. 52 No. 1.*
Offcie of Innovation Development; Advanced Claim Drafting; 16th Annual Independent Inventors Conference; Aug. 15-16, 2014.*
WO 9010378; Nakagawa Takeo; Machine Translation.*

* cited by examiner

Primary Examiner — Michael Zarroli

(57) ABSTRACT

A sun synchronous orbiting shield to block sun light to the earth. Shade is provided to the earth and travels across the earth as the earth rotates mitigating the effects of sunlight on global warming.

1 Claim, 1 Drawing Sheet

—CLIMATE REGULATING SYSTEM ELEMENTS—
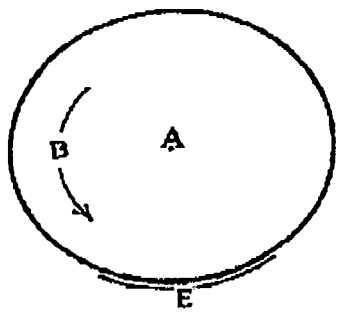
A. EARTH ROTATIONAL AXIS
B. DIRECTION OF ROTATION
C. SUN SHIELD—BLOCKS HEAT
D. SUN
E. SUN SHADOW—ON EARTH
F. SHIELD—ROTATION ORBIT
G. DIRECTION OF SUN BEAM
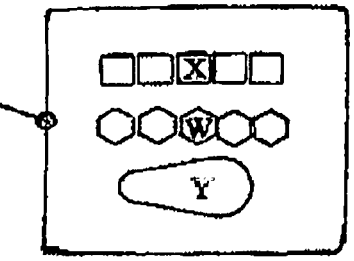
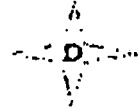
X. ROLLED UP SHIELDS
W. POSITIONING THRUSTERS
Y. PARKING – SPENT ROCKETS
Z. SATTELITE LOCATED ASSEMBLY FIXTURE

CLIMATE-REGULATING-SYSTEM

FIELD OF THE INVENTION

This patent document describes a unique new method of controlling earth's climate factors. Currently most of those few who observe the evidence that earth is on track to create the extinction of our biological inheritance are not prepared to take action, such as described here, and accept the prediction that humans will go to extinction, perhaps in or before the end of this century. This invention presents, offers humanity, facts, that enable understanding, how the current state and rate of climate deterioration can be changed, reversed, and controlled by humans. The process presented here, creates, enables, preserving a viable earth climate for humans, and other supporting biological plants and animals. How to pull together elements from existing technology has required this inventor to visualize and combine a variety of process never before combined in such a unique system that is world size in dimension and many dimensional multiples of prior human creations and structures. Starting the path that revealed a solution, the earth recovery system began by this inventor examining the climate question before humanity. Global-Warming, is now well recognized to have been achieved in less than the last 100 years, through technologies that utilized eons of stored plant energy contained in now commonly acknowledged fuels, principally petroleum and coal. Accepting in recognition of the human involvement that resulted in the massive burning of carbon containing fuels requires asking the question, what can ordinary humans do to correct the damage now evident? This invention having a worldview of the issue directly utilizes technologies, and cooperative specialty businesses, that when combined and coordinated, permit the projection, that human, guided, directed activities are capable of changing the outlook from one of despair to one of cautious optimism. Earth now is in a state of perilous change and rapidly accelerating climate destruction, that fact means that humans must promptly coalesce and cooperate in fashioning the structures and functional elements defined here. This is a unique new creation for humanity, and no other creature or physical manifestation of nature has the capacity, predictably, to accomplish the task described in this cooperative system invention.

BACKGROUND

"Climate report: It's now or never"
"U.N. panel calls for urgent transition to clean energy"
Wendy Koch (USA Today).
April 2004
"All hope is lost for Antarctic glaciers"
Tracy Watson. (Special for USA TODAY)
May 2014
"Study: Earth in midst of mass extinction"
"Human population has doubled while invertebrates wither"
Doyle Rice. (USA TODAY Jul. 26, 2014)
"CLIMATE CHANGE PAST REVERSING"
Doyle Rice. (USA TODAY) Nov. 3, 2014

Often times some excuse delay by saying "better late than never". When it comes to climate destruction later is not acceptable. The time for delay by avoiding action is long past. The path of life on Earth to extinction has no stop signs on it and no point for return. Earth's self-regulating factors now for all practical purposes are shutdown as noted in the headlines above. Most weather watchers now are becoming aware of the shrinking polar ice fields. The process-conditions that established and maintained those regulating ice fields are no longer present therefore reversing those ice fields, cannot be replicated, in or by nature alone.

Humans have caused the ice field destruction because of massive burning of heat generating carbon fuels during the last 100 years at rates way beyond normal variations that repeatedly occurred in nature. That data now is well-documented by measurements of ice core carbon dioxide captured in south polar ice-snow deposits that were examined, and viewed, in those polar ice core samples representing more than 400,000 years of accumulated layered data.

The noted headlined U.N. report is useless due to the minimal effect the proposed transition to renewal energy could produce. The report appears to be mostly political by the fact that it does not focus on the causative process of continued acceleration of carbon fuel usage.

The first step in human endeavors to remediate the life destruction now in progress must be the elimination of burning carbon fuel materials. A replacement clean fuel, hydrogen, costs significantly less, and the technology base to support its use is complete.

The merchants of those carbon based fuel materials are advertising repeatedly, at high cost-expense, with elaborate graphical theatrical disinformation presentations. Those advertisements attempt to convince large segments of the public, along with donations to politicians that support the proposed acceleration in burning of carbon base fuels. Now humans are increasing fuel use, as more supplies enter the market. In spite of the adverse aspects that burning carbon produces on the atmosphere. Those carbon fuels cost much more than hydrogen by a factor of three to one. Continued use of them, besides being economically wrong, are unsustainable, and considering the current state of climate destruction, burning those carbon fuels has produced, worldwide quantifiable damage. Humans alone caused the current degenerated climate situation, and those advocates of continued burning of carbon fuels falsely state that change away from them will cost-eliminate jobs and depress economic activity, when the facts show the opposite.

Better energy policies must be established, followed, and supported. Contrary to the false position, the merchants of those carbon based fuels take, changing to hydrogen will provide many more jobs than continuing with carbon based fuels. In the U.S.A., changing, will recover the subsidy funds now given to those producers. All citizens, consumers, now share in the payment of taxes that the carbon fuel producers now collect for profit. Correcting the accumulated climate damage now requires human action by changing to a long-term view of climate, that is, to reestablish the effects of former norms. No known natural climate processes involved have the capability to function in reverse automatically. Therefor humans must "step up to the plate" and take immediate remedial action. Humans must, utilize, take advantage of existing, unique, specialized, combinations of processes, materials, and actions. Success using, combining, building upon, well-known, separately developed technologies to build the required structures that will function, that will succeed, and stimulate, to restore earth's climate after extended time. This will provide, the function of former ice features that can in the future return to function having, been enabled, to resume a normal self-regulating control. Fifty years ago, humans did not have the tools-technology base that could allow human intervention, but now, well-developed, commercial, mostly military funded technology is available to assist, apply, to the restoration needed. Action to begin the remediation of the current state of climate destruction must begin immediately because building the equipment required will take resolve and time for construction of a world size system-structure. Widespread knowledge of this work, technology, must be distributed and made available to all organized society. Most humans must be educated, to understand the task details. "Seven generation sustainability" is a cultural, social, ecological concept that urges the current generation of humans to live sustainably. Humans must work together following guidelines of the concept for the benefit of the seventh-generation into the future. The seven-generation family concept originated with the IROQUOIS 'Great Law of the Iroquois'. That guide teaches humans to think seven generations ahead, about 140 years into the future. They then must decide whether the decisions they make today will benefit their children seven generations into the future. Only humans, worldwide, have the abilities to, organize, fashion, build, and install, the required regulating structures to replace lost natural processes. One should expect most informed religious and educated humans to be aware of the other religious commandments that tell humans to be responsible, taking good stewardship, for care of the earth, as they would care for their own family. As they become familiar with the actions that they must personally take to help save earth and the climate from destruction they will act individually and in cooperation with others, to support efforts outlined here.

The action here is to inform humans now of the details describing the structures that are required to restore the natural balance of climate that is necessary if humans desire to stop the current rush to life extinction of all earths living creatures. Please take note that, extinction is final, and that after loss of a suitable climate that fosters a sustainable living biology that Earth will, in time, lose its atmosphere, oceans, and ultimately look like Mars that looks like it may have had water and a climate. To be certain the meaning of extinction is clear, if all humans suddenly die tomorrow, and this equipment is not installed, that Earth will soon lose all biological life forms, and in time, Earth will become a simple cold sphere of dry rock having no atmosphere and will join Mars in its lifeless orbit. It is not appropriate, here, now, in this section to elaborate details (see claims section). Experience in business has established knowledge about human behavior that exists in competitive enterprises where stealing of information like this, when done, results in project failure because the information was not adequately understood by the opportunist who attempted to benefit from the stolen technology. That undesired action blocked here protects details. As details, (See claims list) in a formal patent, that is the appropriate place, to exhibit and control use of this process.

To fund the work that must be done to generate a comprehensive work construction proposal requires the generation of funds to create the detail calculations, estimates, schedules, and costs that will be necessary for proposals to be submitted to various government's and or specialty business entities who must be players in such a huge world life preserving activity.

As of now, the political and business attitudes always focused on influencing profits ignores totally the fact of impending life extinction when the current policies reflected in burning carbon fuels disavows the damage being created by the favored carbon burning policies, always driven by profit motives, but often falsely attributed to job creation as well, and always denying fact. To have an effective influence on future policy relating to burning carbon fuels and recovering a suitable future climate, an elaborate dramatic series of publicity type advertisements must be designed and executed to format a new human consensus for the urgent requirement to pursue a better path for human endeavors based on rectifying human caused climate destruction. That task will require greater funds than detailing the technical tasks.

To address the required human directed activity that can result in a sustainable climate; many governmental, social, business, and political interests must be gathered together and presented with the vital actions that each element or group must understand to fully effect-take action, organizing, building, the elements in that group for action. Those actions are coordinated using this patent process. At this time, such cooperation is not generally recognized, accepted, or acted on. All must understand and cooperate on construction of a technical solution that will stop and reverse the current, present process, of human generated life destruction, now moving on its inevitable natural destructive path, a path that now is set in motion by human behavior.

Now humans are following the money path thinking, believing, that the good life is in the extraction, production, and burning of carbon based fuels. It is time to re think the merits of burning those fuels. The simple word used to describe crimes of violence is murder. Humans should begin to use that term when discussing climate change because it conveys the seriousness of the message that destruction of climate must stop. Taxing use of carbon fuels must happen to quantify the costs occurring. Production at full scale can be immediate when hydrogen fuel is declared-selected as the clean fuel required, desired. Hydrogen can be stripped-taken from the petroleum fuels for immediate needs. Further action, beginning with laws to curtail burning such dangerous life threatening materials now must be created promptly. Taking away the current subsidy incentives to burn carbon fuels and natural gas fuels, now present everywhere humans gather in great numbers, must happen. Hydrogen extracted by electrolysis out of water can be, must be marketed now, wherever humans live, and it is nonpolluting, burning hydrogen in the atmosphere generates only clean water, burning hydrogen does not form carbon dioxide. Hydrogen contains more energy per pound than all carbon-based fuels. When fuel costs, are compared, Hydrogen is least costly.

OBJECTS OF THE INVENTION

This invention coordinates, optimizes, and directs world culture and industrial technology to achieve a worthwhile urgent task. By identifying, existing technologies, investments, cultures, manufacturing facilities, organizations, influences, political social communications, and taking action is vital. Those facilities, entities, must be included so that all involved are attracted to the possibility of profitable work as well as the opportunity to save earth's climate for preservation and 0000 future stability. To use this Invention involves, requires, the voluntary participation of all segments of organized world society. The unique shade structure described and its location is the special innovative organizational center, core, of the diverse fabricating center forming the business coordinating structure that enables a system to be manufactured-fabricated, transported, and located, in space. That central core creates the base to utilize human capability to work in cooperation, thus fostering a concerted application of human abilities to act in a harmonious way. Design of that element must avoid profit motives that normally guide behavior only for domination, selfish ends, but rather directs human activity fully to the task of preserving a livable earth and its inhabitants. This work must focus on preservation of earth's life supporting qualities meshing to permit an integrated system in operation. That does not exclude cooperation while also earning rewards for work accomplished. The task is huge and workers must have good pay to survive as the task proceeds, This Inventor, or a designated director, (perhaps an existing government agency) must take on the task as a project leader to coordinate the multiple tasks of all the various participants. It is not obvious to most humans, known by the lack of any attention by most humans that they might have been responsible for the damage burning carbon materials could cause to the atmosphere. Nor do they exhibit any creative enterprise or talk of such responsibility, they remain solidly walking on earth with no action to alter, change, what is known to them about climate. The task now is to awaken humans to the damaged state to the Earth that nourishes humans, and that they must fully know the effect of their actions, or inactions, thus raising awareness of their behavior that contributed to the perilous state that is threatening human continuing existence on Earth.

SUMMARY OF THE INVENTION

In the embodiment chosen for illustration, (see FIGURE—CLIMATE REGULATING SYSTEM ELEMENTS—) an orbiting sheet and or fabric shield-shade many square miles in dimension and surface area, that is located in earth orbit above earth's atmosphere centralized near the equator. The orbiting shield-shade is in motion in a Sun synchronous orbit, that is, it rotates in a direction opposite to earth's normal daily rotation, that direction or rotation permits the shade to maintain a single position relative to the Sun. With that special difference, the shade passes over all of earth-shaded-surface rotating below each day, with about one hour where sun light at earth surface is lessened-dimmed at any shaded location near noontime at that location. The size of shade area must be scaled in area in a ratio equal to about fifty percent of the polar ice fields, reflecting the better shading efficiency achieved-present when the shade is acting near midday at the equator, that means proportional in area, to the historical polar glacial features now melting, disappearing. This invention is not ordinarily obvious by its very nature of global impact that requires specialized knowledge and cooperation by most citizens of and in whatever country or social organization each chooses to participate, with other humans. This invention contains special structures along with new cooperating separate business structures that permit a coordinated complex task, involving diverse businesses, and a technical fabricated shield-shade.

BRIEF DESCRIPTION OF THE DRAWING

The drawing features three significant elements. The three principle items are, the Sun (D) shown as a four-pointed star, Earth (A) is shown as a circular element, a Shade-Shield (C) is shown as a short line are spaced below the circular Earth figure, and a list of descriptive words identifying the three elements and their direction of rotation-movement.

DETAILED DESCRIPTION OF THE PREFERRED EMBODIMENT

This detailed document illustrating the scope of an Invention describes a new method of controlling earth climate factors. Currently those few who observe the evidence that earth is on track to create the extinction of our biological inheritance are not prepared to take action, and accept the prediction that humans will go to extinction, perhaps in or before the end of this century. This invention instructs humans to know how the current state and rate of climate deterioration can be changed, reversed, and controlled by humans, thus preserving (if promptly achieved) a viable climate for humans, and other supporting biological plants and animals.

Note the inclusion of a FIGURE titled—CLIMATE REGULATING SYSTEM ELEMENTS—.

This invention formats the materials, actions, required to create an orbiting earth sun shade-shield that orbits earth in a counter rotation to earth's normal daily rotation. The rotation differences permit erection of a shield-shade element that forms a sun-synchronous earth shading satellite that remains in a single position relative to the sun, thus maintaining a single time related position relative to the earth surface passing beneath the shade. That orientation schedules, by its preselected location, to cover-shade progressive sections of earth's surface as earth rotates in its daily cycle relative to the sun. That position outside of earth's atmosphere permits shading a section of earth in a zone oriented along both sides of the equator of earth in a daily time-period selected to occur about one or two hours before and after the instantaneous local noontime each day. The function that the shade satellite provides at earth's surface is a zone of reduced solar energy and light at the surface. The interruption to the sun energy falling on earth reduces solar heating at the surface at a time near the daily maximum. The midday selection is best to achieve maximum effectiveness in reducing heating. That occurs because the selected section of earth shaded daily is in the zone on earth surface (circumference) where heating normally is highest. With the shade located adjacent to and lined up to the equator, where the concentration of sun light has the highest intensity, thus efficiently, reducing its inherent high potential to heat earth. That time duration orientation minimizes the area of shade required. The normal light dispersion at the earth surface just before and after the sun shield-shade display is active minimizes the reduced surface daylight available for normal daylight time commerce and thus will not disrupt most commerce. The visual, at the surface effect, will appear, be observed, just like clouds overhead that temporarily diminish surface light.

Having the shading effect located at the earth equator is optimum because at that zone the distribution of land surface and ocean surface favors reducing earth heating because the ocean waters absorb a much higher amount of Sun energy, than does the earth land surface. At the zone of the equator, the amount of surface exposed to water and soil is near equal in area. The ratio of surface heating rate, of water contrasted to land, is about three to one so that the selection of shading from a satellite, rather than a shade terrestrially located, has heat blocking that is much superior. The out of earth's atmosphere satellite location drastically lowers cost to establish, construct, the shade. As a satellite, that position is much more efficient considering the amount of material required to build and maintain it. The satellite location also avoids the vandalism that an earth surface placement typically should-would show. Note that no land surface location is suitable for this function.

Sun light at Earth surface always provided all the energy utilized at the surface that has provided the life stimulating energy for plants to grow and animals to thrive. That sun energy was required in order for earth to maintain favorable surface and climate temperatures, that the evolved creatures on earth now utilize to thrive, but as global earth heating has progressed, those favorable temperatures are diminishing.

That means the sun is causing an increase in earth temperature that is evident-measured, and it now is increasing to the point that the biological life now present is so highly stressed it will wither and die in the very near future considering earths accelerated geological pace of change taking place that was caused, initiated, by human behavior.

At this time all of the required technology, materials, knowledge to design, to organize, to fabricate, to control, and to install the climate regulating system is mature and available mostly commercially for use in this world size system. Coordination of existing technologies as noted in earlier sections is the creative core of the complete process that functions correctly when managed as described herein. Fortunately, there is a less obvious, however, very favorable coincidence, that should prompt citizen and governing elements of society to make wise decisions relating to the satellite usage noted. Burning carbon containing materials must stop! One of the best ways to prompt that need is for commerce worldwide to participate in reducing burning carbon. Currently the petroleum industry is very actively advertising information telling humans that the products they sell are beneficial, despite the fact that burning them is the forcing function in global heating.

The burning of carbon fuels can be drastically reduced, and fully funded, using newer business methods. An example of an alternative practice is extracting hydrogen from petroleum. That process leaves behind carbon. The carbon will be useful in construction of the shield. The material for that use must be lightweight and have high strength. Carbon structures now are common in transport aircraft fuselages, fishing poles, bows and arrows for archery, and bicycles for racing. Hydrogen will become the standard fuel in the future when made using wind, solar energy, water, insuring completely environmentally clean fuel. There are lower cost, clean, fuel options, than extracting hydrogen from petroleum as noted above, however that use will be to assist transition to lower cost fuel, work retraining, investment shifting, during transitioning.

The invention claimed is:

1. A shield for mitigating the effects of sunlight on the earth, comprising,
   a shield deployed in orbit above the earth, outside of the earth's atmosphere and centralized near the earth's equator,
   the shield orbit is a sun synchronous orbit,
   this shield is made of an opaque or reflective fabric sheet like shroud that blocks sunlight to the earth,
   this shield provides a shade, whereby the shade provided by the shield travels across the earth in a counter direction to the earth orbit and is positioned to block noon day sun,
   the shield will be capable of accommodating messages,
   the shield is a monolithic structure capable of being joined with other similar shields, the shields are capable of being joined together in various configurations, the shields are further capable of being joined together utilizing rip stop strips or hook and loop fasteners,
   any assemble of one or more shields will be capable of being positioned in orbit utilizing thrusters,
   the shield or shields will be capable of automated assembly and operation.

* * * * *